R. N. LYON AND J. J. HILL.
ADJUSTABLE FINGER HOOK.
APPLICATION FILED MAR. 18, 1919.

1,322,458.

Patented Nov. 18, 1919.

Witnesses
R. G. Thomas

Inventors
R. N. Lyon
J. J. Hill
Victor J. Evans
Attorney

UNITED STATES PATENT OFFICE.

ROBERT N. LYON AND JACKSON J. HILL, OF KELLOGG, IDAHO.

ADJUSTABLE FINGER-HOOK.

1,322,458.               Specification of Letters Patent.       Patented Nov. 18, 1919.

Application filed March 18, 1919. Serial No. 283,370.

*To all whom it may concern:*

Be it known that we, ROBERT N. LYON and JACKSON J. HILL, citizens of the United States, residing at Kellogg, in the county of Shoshone and State of Idaho, have invented new and useful Improvements in Adjustable Finger-Hooks, of which the following is a specification.

This invention has reference to a means for securing skid or mud chains on a wheel of an automobile or other vehicle, and has for its object to produce a simple device of this character whereby the chains may be quickly attached and easily removed.

A further object of the invention is to produce a device of this character in which any slack in the chain may be taken up in an easy manner.

A still further object of the invention is to produce a device of this character which is of a simple nature and which may be cheaply manufactured and marketed and one which will perform the functions for which it is devised with accuracy and with certainty.

The foregoing objects, and others which will appear as the nature of the invention is better understood may be accomplished by a construction illustrated by the drawings, in which.

Figure 1:
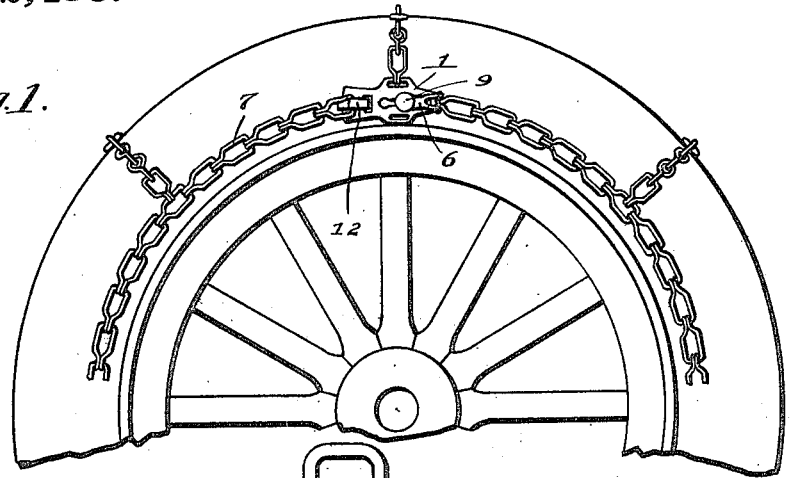
Figure 1 is a view illustrating the improvement connecting the ends of a skid or mud chain.
Figure 3:
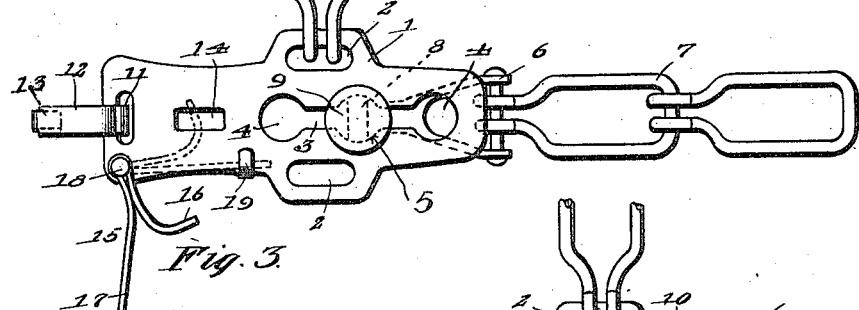
Fig. 3 is an enlarged plan view, the hook connecting one end of the chain being released.
Figure 4:
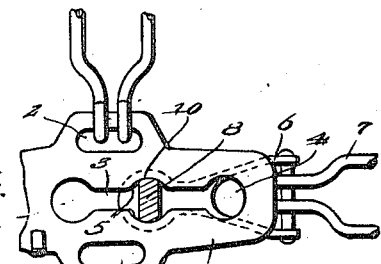
Fig. 4 is a detail sectional view upon the line 4—4 of Fig. 2.
Figure 2:
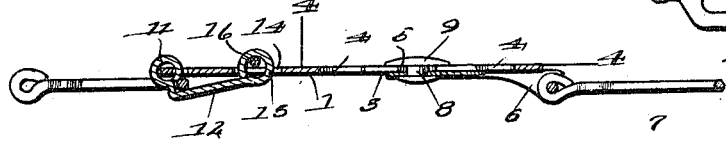
Fig. 2 is a sectional view approximately on the line 2—2 of Fig. 1 and upon a greatly enlarged scale.

The improvement includes a body member which is in the nature of a flat plate preferably having its edges projecting outward at the center thereof and the said projecting portions slitted as at 2 to receive the ends of side chains. The body 1 is centrally provided with an elongated slot 3 extending from the center thereof to adjacent one of its edges, the said elongated slot being disposed between the first mentioned slots 2. The plate at the ends of the slot 3 has round openings 4 communicating with the slot and the side walls provided by the slot 3 are centrally notched as at 5, the walls provided by the notches being round.

On the notched end of the body is a clevis 6 to which is secured one end of a tire, mud or skid chain 7. Secured to the inner end of the clevis is a stud 8 that passes through the longitudinal passage of the slot 3, the said stud being provided with a head 9 that straddles the slot 3 and is arranged on the face of the body opposite that contacted by the clevis. The stud 8 is substantially rectangular in cross section, the narrow portion thereof being arranged transversely with respect to the longitudinal axis of the body and the wider portion of the said stud having its ends round as at 10. By this arrangement it will be noted that when the clevis is arranged at a right angle with respect to the body the same may be slid longitudinally of the slot 3 and when turned to a position parallel to that of the body the rounded ends of the stud 10 will be received in either the openings 4 or the notch 5 that intersect the longitudinal slot 3, and by this means the clevis may be adjusted on the body.

The opposite end of the body 1 has hingedly connected thereto, as at 11 a hook member 12. This hook has its free end provided with an eye 13 designed to be received in an opening 14 in the body, when the hook is swung over the body. The hook is adapted to receive the second end of the chain 7, and when the said hook is brought over the body and the eye thereof received in the opening 14 the said eye is engaged by a locking element which is broadly indicated by the numeral 15. The locking element is preferably constructed of spring wire, bent upon itself to provide at one end a finger 16 that is designed to pass through the eye 13. The locking member is approximately centrally bent upon itself, providing what may be termed an eye and an arm 17 projecting from the eye. Passing through the eye is a pivot member 18 that secures the locking member on the plate or body 1. The spring arm 17 is adapted to be engaged by a notched lug 19 formed on one of the edges of the body 1, the said arm 17, by the resiliency thereof springing in the notch of the said lug and holding the finger 16 in positive engagement with the eye of the hook.

It is thought, from the foregoing description, when taken in connection with the drawings, the simplicity of the construction and the advantages thereof will be perfectly apparent without further detailed description.

Having thus described the invention, what is claimed as new, is:—

1. In a device for the purpose set forth, a body, a pivoted hook at one end thereof, means for locking the hook to the body, a longitudinally movable clevis at the other end of the body, and means for securing said clevis at adjusted positions on the body.

2. In a device for the purpose set forth, a body having its edges widened at the center thereof and the said widened portions slotted, a hook hingedly secured to one end of the body, said hook having its free end formed with an eye and a body having an opening to receive the eye, locking means on the body designed to engage in the eye, and a longitudinally adjustable clevis on the body.

3. In a device for the purpose set forth, a flat body, a hooked member hinged to one end of the body, an eye on the free end of the hook, said body having an opening to receive the eye, pivoted locking means comprising a spring member including an offset finger designed to be received in the eye and an arm, a notched lug on the body designed to receive the arm to hold the finger in locking position with respect to the eye, and a longitudinally adjustable clevis on the body.

4. In a device for the purpose set forth, a flat body, a hook hinged to one end thereof, locking means for said hook, said body having an elongated slot the end walls of which being enlarged and rounded, side walls having oppositely disposed rounded notches, a clevis, a rectangular stud on the clevis passing through the slot, a head on the stud bridging the slot, and said clevis, when turned to one position designed to permit of the stud passing through the slot, and when turned to another position to have the said stud engage in the notches or in the widened ends of the slot to hold the clevis adjusted on the body.

In testimony whereof we affix our signatures.

ROBERT N. LYON.
JACKSON J. HILL.